Patented July 28, 1936

2,048,785

UNITED STATES PATENT OFFICE 2,048,785

COLORATION OF MATERIALS

George Holland Ellis and Henry Charles Olpin, Spondon, near Derby, England, assignors to Celanese Corporation of America, a corporation of Delaware No Drawing. Application March 15, 1933, Serial No. 660,858. In Great Britain April 9, 1932

6 Claims. (Cl. 8—5)

This invention relates to the coloration of materials and more particularly to the coloration of textile materials made of or containing an organic derivative of cellulose.

In the production of colorations on textile materials made of or containing cellulose esters or ethers a number of valuable colorations, particularly browns and blacks, may be obtained by the oxidation on the materials of an aromatic compound, for example an aromatic amine. Thus for example a black of great utility may be obtained by the oxidation on the materials of aniline. For the production of these oxidation colorations the aromatic compound is usually applied to the materials in conjunction with oxidizing agents, particularly chlorates, to oxidize the compound, catalysts, for example copper or vanadium compounds, being also employed, and the materials are then steamed or aged to bring about or complete oxidation.

When it is desired to obtain pattern effects using these oxidation colorations as the ground coloration the formation of the coloration may conveniently be resisted in selected areas by means of suitable resist agents. Thus for example a composition containing a resist agent may be applied locally to the materials and the aromatic compound then applied by padding or other convenient method. On effecting oxidation the material is not colored by the oxidation color in the resisted areas.

A convenient method of resisting aniline blacks and other oxidation colorations on these materials is to apply an alkaline resist. Hydrosulphites and metal aldehyde sulphoxylates have also been employed for the same purpose. Where, however, colored pattern effects are desired and a coloring matter has been incorporated in the resist composition to color the resisted areas, the oxidizing agent of the oxidation composition may destroy or otherwise deleteriously affect the coloring matter. The alkali of an alkaline resist, though preventing the formation of the oxidation coloration, does not destroy the oxidizing agent and so does not prevent destruction of the coloring matter. Hydrosulphites and sulphoxylates, on the other hand, whilst preventing the destruction of the coloring matters by oxidation, may themselves reduce or otherwise destroy the coloring matter. Since the number of dyestuffs which may be utilized for the coloration of cellulose ester and ether materials is already restricted, the further restriction of the number of dyestuffs which may be employed for coloring resists under oxidation colors on these materials is a serious matter. There are indeed very few colors which are resistant to chlorates and to hydrosulphites or metal aldehyde sulphoxylates, and which have affinity for cellulose ester and ether materials.

The present invention comprises resisting oxidation colorations on materials made of or containing cellulose esters or ethers by means of easily oxidizable compounds which are not strong reducing agents. Excellent resist effects may thus be obtained, and in producing colored resists with the aid of such compounds a very wide range of dyestuffs is available, for example many of the insoluble azo, nitrodiarylamine, and aminoanthraquinone dyestuffs commonly used for the coloration of cellulose esters and ethers.

Among easily oxidizable compounds which may be employed in accordance with the present invention may be mentioned stannous or ferrous salts or other compounds, and glucose. It has, however, been found particularly advantageous to employ mild reducing agents which are salts of the lower oxy acids of sulphur. Thus for example in the production of resists on cellulose ester and ether materials sulphites and thiosulphates may be employed. When using resist compositions containing these resist agents a wide variety of dyestuffs may be employed for coloring the resists. Thus for example in the production of colored resists on cellulose ester and ether materials amino anthraquinone dyestuffs may be employed which would otherwise be deleteriously affected by the chlorate or other oxidizing agent used for the production of the oxidation coloration, or by a sulphoxylate if such were employed as the resist agent. Especially valuable are those easily oxidizable compounds which do not reduce simple amino anthraquinone dyestuffs under the conditions employed for the production of the oxidation color. This requirement is fulfilled by stannous salts and by thiosulphates.

The compositions may be applied to the materials by any convenient method of local application, such for example as printing, stencilling, or the like before or after padding or otherwise treating the materials with a composition containing the aromatic compound and an oxidizing agent. Thus for example the materials may be printed with a resist composition containing a thiosulphate and then padded with a composition containing aniline, for example one of those described in U. S. application S. No. 424,442 filed 29th January, 1930 and U. S. application S. No. 635,042 filed 27th September, 1932. Examples of other aromatic compounds which may be employed are para-amino-diphenylamine and para-phenylene-diamine. After application of the resist and the composition containing the aromatic compound the materials are dried, aged, chromed, and soaped and subjected to any other desired after-treatment when excellent pattern effects are obtained on a ground colored by the oxidation coloration.

The following example illustrates the invention without in any way limiting it:—

Example

A cellulose acetate fabric is printed with a paste containing:—

| | Parts |
|---|---|
| Coloring matter (10% paste) | 10 |
| Methylated spirit | 5 |
| Water | 10 |
| Gum arabic 1:1 | 40 |
| Sodium acetate | 20 |
| Zinc oxide (50% paste) | 10 |
| Sodium thiosulphate or stannous chloride | 5 |
| | 100 |

Among coloring matters which may be used in the above composition are 2:4-dinitro-4'-amino-diphenylamine, 1:4-diamino anthroquinone, 1:4-diamino-2-methoxy-anthraquinone, p-oxy-benzene-azo-phenyl-methyl-pyrazolone, and duranol blue G.

The printed fabric is then padded with an aniline black liquor containing:—

| | Parts |
|---|---|
| Aniline hydrochloride | 1,200 |
| Acetic acid (glacial) | 240 |
| Methylated spirits | 960 |
| Water | 3,500 |
| 10% tragacanth thickening | 2,500 |
| Sodium chlorate | 768 |
| Cupric chloride | 28.8 |
| Water | 803.2 |
| | 10,000 | and dried, aged, chromed, and washed when a colored discharge is obtained on a black ground.

Among materials which may be treated in accordance with the present invention may be mentioned in addition to cellulose acetate already referred to, cellulose formate, cellulose propionate, cellulose butyrate, or other cellulose ester, or ethyl cellulose, or benzyl cellulose, or other cellulose ether. The materials may contain fibres of any of these cellulose derivatives alone or in admixture with other cellulose derivative fibres or with animal, vegetable or artificial fibres other than cellulose derivative fibres. Thus for example the materials treated may contain cellulose ester or ether fibres in admixture with cotton, wool, silk or regenerated cellulose fibres.

What we claim and desire to secure by Letters Patent is:—

1. Process for the production of colored effects on materials containing organic derivatives of cellulose, which comprises locally resisting the production of colorations by oxidation of aromatic amines thereon with a composition containing a stannous compound and a dyestuff capable of being fixed in the materials and which is resistant to said stannous compound.

2. Process for the production of colored effects on materials containing cellulose acetate, which comprises locally resisting the production of aniline-blacks thereon with a composition containing a stannous compound and a dyestuff capable of being fixed in the materials and which is resistant to said stannous compound.

3. Process for the production of colored effects on materials containing cellulose acetate, which comprises locally resisting the production of aniline-blacks thereon with a composition, free from caustic alkali, containing a stannous compound and a dyestuff capable of being fixed in the materials and which is resistant to said stannous compound.

4. Process for the production of colored effects on materials containing cellulose acetate, which comprises locally resisting the production of aniline blacks thereon with a composition containing a stannous compound and an amino-anthraquinone dyestuff.

5. Process for the production of colored effects on materials containing organic derivatives of cellulose, which comprises locally resisting the production of aniline-blacks thereon with a composition containing stannous chloride and a dyestuff capable of being fixed in the materials and which is resistant to stannous chloride.

6. Process for the production of colored effects on materials containing cellulose acetate, which comprises locally resisting the production of aniline-blacks thereon with a composition containing stannous chloride and an amino-anthraquinone dyestuff.

GEORGE HOLLAND ELLIS.
HENRY CHARLES OLPIN.